Aug. 9, 1949.
E. W. KELLOGG
2,478,698
LIGHT SLIT PROJECTION SYSTEM WITH
FIELD FLATTENING LENS
Filed Sept. 26, 1945
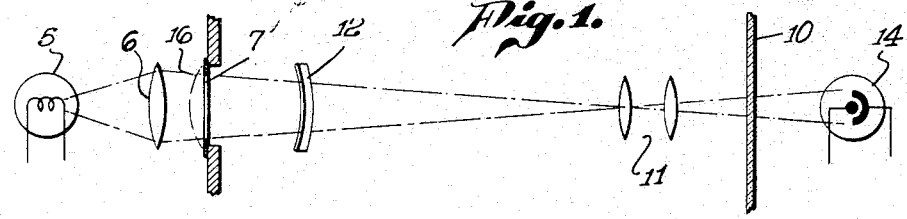
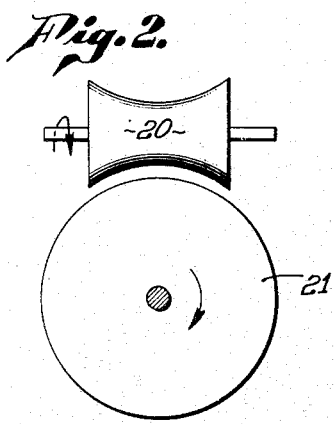
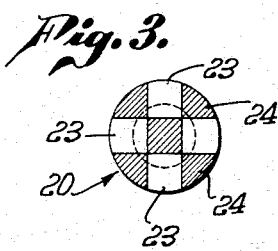
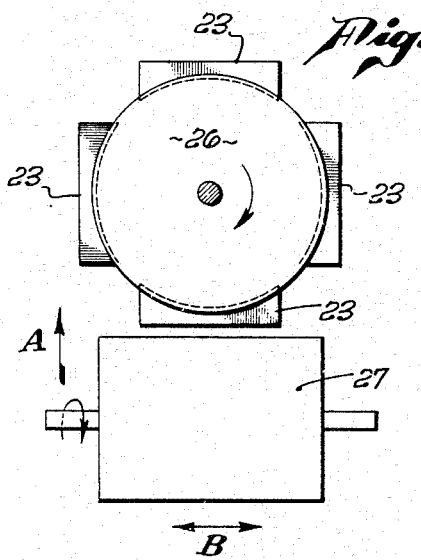
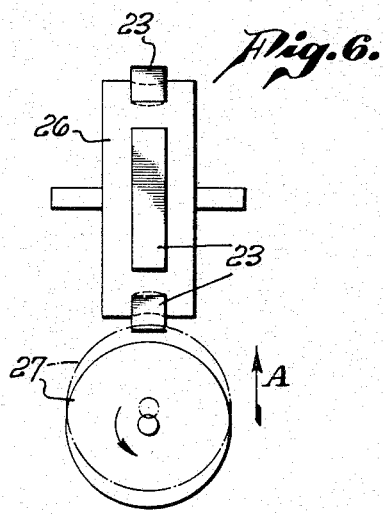
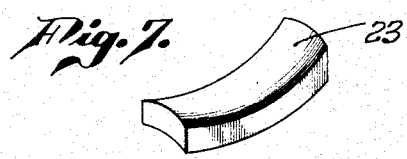
INVENTOR
EDWARD W. KELLOGG,
BY
ATTORNEY Patented Aug. 9, 1949

2,478,698

UNITED STATES PATENT OFFICE 2,478,698

LIGHT SLIT PROJECTION SYSTEM WITH FIELD FLATTENING LENS

Edward W. Kellogg, Indianapolis, Ind., assignor to Radio Corporation of America, a corporation of Delaware Application September 26, 1945, Serial No. 618,775

7 Claims. (Cl. 88—24)

This invention relates to optical systems, and particularly to a specific arrangement of optical elements.

It is well-known that in sound recording and reproducing systems, a straight, elongated light slit is employed, an image of the slit being focused on a flat film area by one or more lenses. The objective of such an optical series employs spherical lenses which do not sharply focus the slit over its entire length. To correct this condition, I provide a special type and form of toric lens between the slit and the objective, the special lens having varying curvature throughout its length. That is, since the objective is effectively stronger for the ends of the slit than for the central portion, the corrective element is employed to bring the elongated slit into focus on the film at all points. This toric lens is like a cylindrical lens in that it has power in the plane perpendicular to the slit but little, if any, power in the plane of the slit, but it differs from an ordinary cylindrical lens in that it has some positive power at its middle and substantially zero power at its ends, the strong part of the cylinder producing a virtual image of the slit farther away from the objective lens than the actual slit, and thus, making it appear curved, as seen from the objective.

It is realized that the manufacture of this type of cylindrical lens is difficult, and one means for its manufacture is described hereinafter.

The principal object of the invention, therefore, is to facilitate the recording and reproducing of sound in which a narrow light slit is employed.

Another object of the invention is to provide an improved optical system for projecting an image of an elongated light slit on a flat film area.

A further object of the invention is to provide a means for producing an optical element having less power at its ends than over its central portion.

A still further object of the invention is to provide means for producing a cylindrical lens having varying power along its length.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a diagrammatic view of a sound reproducing system embodying the invention.

Fig. 2 is a view of an optical element after its first step of manufacture, and of the lap by which it has been ground.

Fig. 3 is an end view of the optical element of Fig. 2, showing the second step of manufacture.

Fig. 4 is a view in perspective of an element after the operation indicated in Fig. 3.

Figs. 5 and 6 are end and plan views, respectively, of the final step in the manufacture of the optical element used in the system shown in Fig. 1, and Fig. 7 is a view in perspective of a finished element.

Referring now to the drawings, in which like numerals identify the same elements, a sound film reproducing system is shown having a light source 5, a collective lens 6, and an elongated slit 7. Light passing through the slit is projected on the sound track area of the film 10 by a compound objective 11 after passing through the new optical element 12. Light passing through the film 10 is impressed on a photoelectric cell 14, which may be connected to any well-known type of electrical reproducing system. In view of the curved field of the objective lens 11, the points which would be in sharp focus upon the film 10 would have to lie along the curved, dotted line 16 at the slit 7. This is because the objective 11 is effectively stronger at the ends of the slit than at the middle. I, therefore, provide a correcting optical element in the form of a special cylindrical lens 12, which will bring all points along the slit 7 into focus on the film, the cylinder 12 having some positive power throughout its middle portion, and substantially zero power at its ends.

To describe the construction of such a cylindrical lens, reference is made to Figs. 2-6, inclusive, wherein the various steps in the manufacture are illustrated. The first operation is to produce, from a glass slab or blank, a spool-shaped torus 20 which has a surface of revolution which fits the cylindrical lap 21. This torus spool 20 is produced by rotating the blank on its axis and by rotating the lap 21 as indicated, bringing the blank and lap together as the material of the blank is ground away. In order that the wear on the lap 21 shall not be confined to one zone, it may be desirable to add to the rotation of the lap, a reciprocating motion along its axis.

After the desired curvature has been obtained, slices are cut from the spool 20, as indicated in Fig. 3, the slices 23 being used to make the lenses, and the cross-hatched portions 24 being discarded. A perspective view of one of the slices is shown in Fig. 4.

The next operation is illustrated in Figs. 5 and 6, wherein the sections 23 are shown mounted on a wheel 26 in any suitable manner, such as by pitch, the ground and lapped surfaces being next to the wheel, and the straight sides being exposed for grinding. The lens elements are placed on wheel 26 with their longer dimensions circumferentially of the wheel. The straight sides are now ground and lapped by rotating the wheel 26 on its axis, as indicated in Figs. 5 and 6, and rotating the lap 27, as indicated by the rotational arrows in these figures. As in Figs. 5 and 6, as the lens material is removed, the lap 27 is fed toward the wheel 26, as shown by arrow A, and, at the same time, the lap is provided with a reciprocating longitudinal motion, as indicated by the double-headed arrow B, to uniformly distribute the wear on the lap. This operation cuts a shallow groove of uniform curvature, in the assembly of lens elements.

It is not absolutely essential that both sides of the lens have a toroid shape. That is, one side of the lens could actually be flat, the single torus producing the variations in power required. However, the torus shape produced by the lap 27 will neutralize some of the lens power that is not required for its function, and this absence of unnecessary power would make the lens suitable for mounting in an optical system of existing design without any critical re-design or adjustments of the other optical elements. It is, of course, desirable that the cylindrical lens 12 have very little, if any, power in the plane of its axis; that is, the plane of the slit 7, and this condition will obtain if the diameter of the assembly of elements on wheel 26 at the completion of the grinding operation is substantially equal to that of lap 21 of Fig. 2.

It is realized, of course, that lenses of this type could be molded, and the grinding operations just described are applicable to making a master from which a suitable mold can be made.

There are several ways of utilizing a lens having one or more toric surfaces to produce the desired effect. For example, a bent cylindrical lens of substantially uniform power, but with its center farther from the slit than its ends when the power is positive, or the ends farther from the slit than the center if the power is negative, would provide a similar result. Such bent cylindrical lenses have toric surfaces which may be produced by grinding operations similar to those I have just described. All of these forms of correcting lens are within the scope of my invention. I have chosen to describe a step of grinding the lens which presents the greatest grinding difficulties, and which is the preferred form of my invention, in that by varying both the curvature and the distance from the slit, the necessary correction can be achieved with less radical difference in distance, and with less average power. Broadly, my invention consists in utilizing a toric lens between the slit and the objective, which acts unequally on the center and ends of the slit, to produce a virtual image of the slit, farther from the objective at the center than at the ends. Thus, the expression "more positive power near the center than at the ends," is to be understood to refer to an algebraic difference, and zero power at the middle and negative power at the ends, would come within the description of "more positive power at the middle."

Since any production of a virtual image displaced from the actual slit involves either magnification or reduction, this may be corrected by making the actual slit wider at the ends than at the center, in order that its image on the film may be uniform in width.

I claim:

1. In an optical system, an objective lens for forming an image of a flat light slit on a flat surface and having a stronger positive power over the end portions of said slit than over the middle portion thereof, and a field flattening lens, the axes of said slit, said objective lens, and said field flattening lens being substantially aligned, said field flattening lens being mounted intermediate said slit and said objective lens and spaced from said slit a fraction of the focal length of said objective, said field flattening lens having substantially zero lens power in a plane parallel to the slit and a greater positive power over its middle portion than over its end portions in a plane perpendicular to said slit, the difference between said powers over the middle and end portions being of such a magnitude as to compensate in said plane perpendicular to said slit for the field curvature of said objective lens.

2. An optical system in accordance with claim 1, in which said field flattening lens has at least one toric surface with its concave face toward said slit.

3. In an optical system the combination of an objective for forming an image of an elongated slit on a flat surface and having field curvature, and an elongated optical element, the axes of said slit, said objective, and said element being optically and axially aligned, said element being mounted intermediate said slit and said objective and spaced from said slit a fraction of the focal length of said objective, said element having substantially zero lens power in a plane parallel to the slit and a greater positive power over the center portion than over its end portions in planes perpendicular to said slit, the difference between said powers over said center portion and said end portions being of a magnitude to compensate, in said plane perpendicular to said slit for the field curvature of said objective.

4. An elongated lens in accordance with claim 3, in which said lens is a bent cylinder with its center portion at a distance farther from the slit than the end portions thereof.

5. An optical system in accordance with claim 3, in which said lens is a bent negative cylinder with its ends farther from the slit than its center.

6. In an optical system, an objective lens for forming an image of an elongated slit on a flat surface and having a stronger positive power over the end portions of said slit than over the middle portion thereof, and a field flattening lens, the axes of said slit, said objective lens, and said field flattening lens being in substantial alignment, said field flattening lens being mounted intermediate said slit and said objective lens, and spaced from but relatively close to said slit, said lens producing a virtual image of said slit, as seen from said objective lens, which is curved with respect to the plane of said slit with the concave side of said curve toward said objective, and said lens serving as a meniscus lens in a plane parallel to said slit, the curvature of said lens in a plane perpendicular to said slit and its spacing relative to said slit being adjusted to produce greater magnification of the central portion of said slit than of the end portions thereof, the curvature of said virtual image being of such magnitude as to compensate, in said plane perpendicular to said slit for the field curvature of said objective lens.

7. An optical system as described in claim 6, in which said slit is wider at the ends than at the middle in such a ratio as to compensate for the difference in reduction ratio produced by the objective lens and the field flattening lens, so that the slit image at the film is of uniform width.

EDWARD W. KELLOGG.

REFERENCES CITED

The following references are of record in the file of this patent:

UNITED STATES PATENTS

| Number | Name | Date |
|---|---|---|
| 1,399,400 | Pellow | Dec. 6, 1921 |
| 1,421,523 | Mechaw | July 4, 1922 |
| 2,005,718 | Dessenberg | June 25, 1935 |
| 2,037,739 | Safranski | Apr. 21, 1936 |
| 2,043,916 | Altman | June 9, 1936 |
| 2,120,263 | Ross | June 14, 1938 |
| 2,146,905 | McLeod et al. | Feb. 14, 1939 |